Jan. 19, 1965 C. E. SHULZE 3,165,864
REFRACTORY BODY HAVING HIGH RESISTANCE
TO FLAME EROSION AND THERMAL SHOCK
Filed March 13, 1961 2 Sheets-Sheet 1

INVENTOR.
CHARLES E. SHULZE
BY
ATTORNEY

Jan. 19, 1965

C. E. SHULZE 3,165,864

REFRACTORY BODY HAVING HIGH RESISTANCE
TO FLAME EROSION AND THERMAL SHOCK

Filed March 13, 1961

INVENTOR.
CHARLES E. SHULZE
BY
K.W. Brownell
ATTORNEY

3,165,864
REFRACTORY BODY HAVING HIGH RESISTANCE TO FLAME EROSION AND THERMAL SHOCK
Charles E. Shulze, North Tonawanda, N.Y., assignor to The Carborundum Company, Niagara Falls, N.Y., a corporation of Delaware
Filed Mar. 13, 1961, Ser. No. 95,778
11 Claims. (Cl. 50—464)

This invention relates to refractory bodies which are well adapted for use in high temperature applications, and more particularly to refractory bodies which are highly resistant to flame erosion and thermal shock and to their production.

In high temperature applications such as rocket nozzles for high energy fuel systems, it is necessary to employ materials which are resistant to both flame erosion and thermal shock, to provide successful rocket launchings and flights. It has been known heretofore that materials such as silicon carbide and boron nitride are highly resistant to flame erosion. However, bodies made of these materials are subject to breakage by thermal shock. This means that when a body made of one of these materials is suddenly raised in temperature from ambient atmospheric temperature to about 2500° C. to 3000° C., the body may fracture as the result of the extreme thermal shock. Additionally, bodies made of these materials are very expensive.

Therefore, the search for materials applicable to withstand the high gas temperatures and velocities produced by fuels of the high energy type now being utilized and contemplated for rocket propulsion is directed toward materials which will withstand both the erosive characteristics of the flames produced and the extreme thermal shocks encountered.

Also in industry, increasingly high temperatures wherein flame erosion and thermal shock are present, are being employed, for example, to fabricate high temperature components for space vehicles. Accordingly, furnace liners, checker works, insulating materials and the like, capable of withstanding these rigid conditions are needed.

In my companion application, Serial No. 95,777, filed simultaneously herewith, there is described a refractory body of extremely high heat shock resistance which is well adapted for use in high temperature applications where high resistance to thermal shock is an important consideration. The body there disclosed is of 2-phase structure including a continuous phase and a dispersed phase. The continuous phase is a dense refractory material of high Young's modulus of elasticity and the dispersed phase is a refractory material of low Young's modulus of elasticity. The two phases are equally distributed throughout the body to provide extremely high resistance to thermal shock. The present invention is a refinement upon the invention of the companion application, providing not only high thermal shock resistance as disclosed in that case, but also providing a body having extremely high flame erosion resistance at a flame-contacting surface thereof.

It is accordingly an important object of the present invention to provide refractory bodies which are highly resistant to flame erosion and thermal shock.

Another object is to provide refractory bodies which are highly resistant to flame erosion and thermal shock and that are adapted to use as rocket nozzle liners and the like.

Another object is to provide flame erosion and thermal shock-resistant bodies which are extremely well adapted to use in high temperature applications as encountered in high temperature industrial processes.

These and other objects of the present invention will become more apparent from the following disclosure taken in connection with the accompanying drawings wherein, FIG. 1 is a view through a body, as in section, but with section lines omitted, showing the internal structure of a body of exceptionally high resistance to flame erosion and thermal shock, as made in accordance with the present invention;

Broadly the present invention relates to refractory bodies of high resistance to flame erosion and thermal shock and which are comprised of two phases, namely a continuous phase and a dispersed phase. The continuous phase consists of a dense refractory material of high Young's modulus of elasticity which imparts extremely high flame erosion resistance, and the dispersed phase consists of a refractory material of low Young's modulus of elasticity which imparts extremely high resistance to thermal shock. In a body of the invention, the continuous phase is of 100% concentration at the flame-contacting surface of the body, imparting high flame erosion resistance at such surface, and the dispersed phase is of 0% concentration at the flame contacting surface. Therefore, maximum flame-erosion resistance is provided. However, immediately adjacent the flame-contacting surface, the continuous phase begins to diminish in concentration and the dispersed phase begins to increase in concentration. The dispersed phase increases in concentration from a point adjacent the flame-contacting surface into the body and the continuous phase diminishes in concentration. Thus the continuous phase may diminish to 0% concentration and the dispersed phase increase to 100% concentration at a surface other than the flame-contacting surface.

Figure 1:
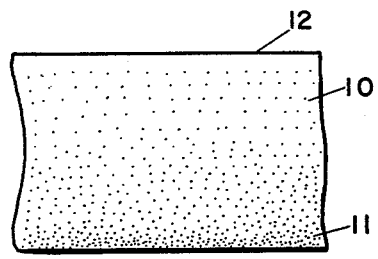

As shown in FIGURE 1, a body made in accordance with this invention consists of a continuous phase 10 of a dense refractory material of high Young's modulus of elasticity, such as a carbide or nitride and a dispersed phase 11 of a refractory material of low Young's modulus of elasticity, such as graphite. The dispersed phase increases from zero on the flame contacting surface 12 to substantially 100% at the other surface, which may be a supporting surface. FIGURE 1 illustrates a theoretical body according to the invention having infinitely varying concentrations of the continuous and dispersed phases from one surface of the body to the other. The flame-contacting surface consists essentially of 100% continuous phase, i.e., dense refractory material of high Young's modulus of elasticity such as a carbide, boride or nitride, which imparts flame erosion resistance. This continuous phase of dense refractory forms a very thin layer at the flame-contacting surface, which immediately blends with and into a less dense zone containing both the dense refractory of the continuous phase and low elastic modulus material of the dispersed phase that gradually dilutes the continuous phase. The material of the dispersed phase can be graphite or the like, which imparts a very high degree of thermal shock resistance to the body. Further, the low elastic modulus material such as graphite of the dispersed phase reduces the bulk density of the body substantially as compared to a product made entirely of dense continuous phase material. This provides a very important advantage in missile work where weight is a very critical factor and where efforts are constantly being made to reduce weight without sacrificing other essential characteristics.

Figure 2:
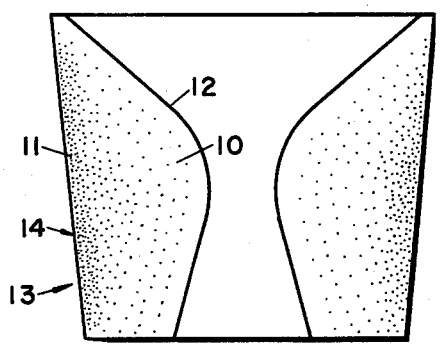
FIG. 2 is a view through a rocket nozzle insert, as in section but with section lines omitted, showing the internal structure of a rocket nozzle of exceptionally high resistance to flame erosion and thermal shock, as made in accordance with the present invention.

FIGURE 2 illustrates the principles of the invention, typified by FIG. 1, as applied to the construction of a rocket nozzle insert 13. The insert is of venturi configuration and the flame contacting surface 12 thereof will be noted to be high density refractory of high elastic modulus such as a carbide or other as explained for FIG. 1. This material forms the continuous phase 10 of the body and in other than the flame-contacting surface contains a dispersed phase 11 consisting of a low elastic modulus material of high thermal shock resistance. It will be noted that the amount of the dispersed phase material increases from zero on the flame contacting surface to 100% at the outer surface 14. The highly dense refractory material forming the inner, flame contacting surface 12 provides high resistance against flame erosion and the dispersed phase 11 in the other parts of the body imparts high thermal shock resistance and also a lowered bulk density.

Figure 3:
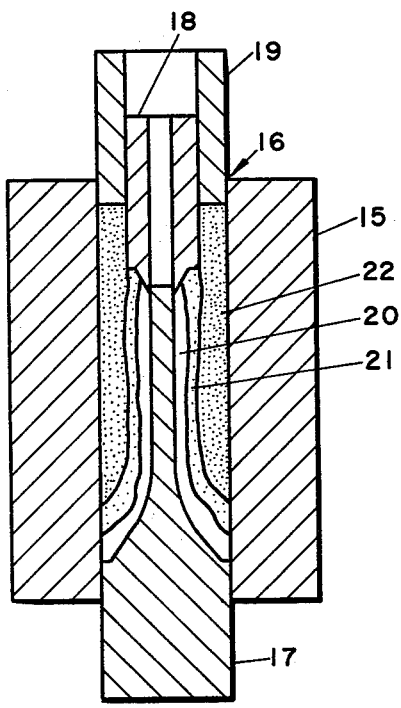
FIG. 3 is a section view through a mold, illustrating the manner in which rocket nozzle inserts and other shapes can be made in accordance with the present invention.
Figure 4:
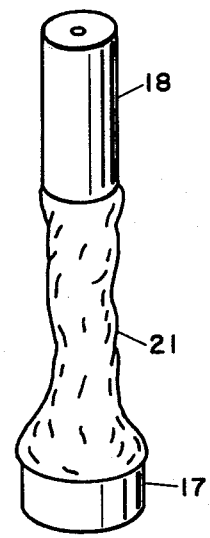
FIG. 4 is a perspective view of the core members employed in the mold of FIG. 3.

FIGURE 3 is a section view through a mold wherein products typified by the rocket insert of FIGURE 2 can be formed. As there shown, the mold consists of four elements, including a sleeve 15 having a generally cylindrical passage 16 therethrough. The other three elements of the mold are designed to function in conjunction with the sleeve 15 and within said passage 16. The other elements include a lower core member 17, an upper core member 18 and a plunger 19. The manner in which the lower and upper core members are employed is shown in FIG. 3 and in the perspective view of FIGURE 4. In forming an article such as exemplified by FIGURE 2, a coating 20 of carbide or nitride is first applied to the lower core member; then the upper core member is positioned thereon. The layer of carbide or nitride is applied as by painting on a slurry of the refractory followed by drying. Thereafter a second coating 21 which contains some of the dispersed phase material is applied over the first coating. This second coating is also dried. The coated core members, as illustrated in FIGURE 3, are then inserted into the passage 16 of the sleeve 15. Thereafter a loose granular mixture of continuous phase material and dispersed phase material is poured into the void space 22 surrounding the core members 17 and 18 and the plunger 19 is placed in position. Thereafter the entire assembly is heated to hot-pressing temperatures and pressure is applied by forcing the lower core member 17, the upper core member 18 and the plunger 19 toward each other. These conditions of pressure and temperature are then maintained until a coherent body is formed from the two coatings 20 and 21 and the loose granular material placed therearound. After a suitable period of pressure and temperature application, the assembly is cooled and the lower and upper core members and the pluger are removed. Separation of the lower and upper core members from each other will provide a body typified by that shown in FIGURE 2.

The present invention is also applicable to the formation of other graded bodies capable of withstanding high temperatures and extreme heat shock and such bodies and their methods of production are illustrated in FIGURES 5 through 8 inclusive.

Figure 5:
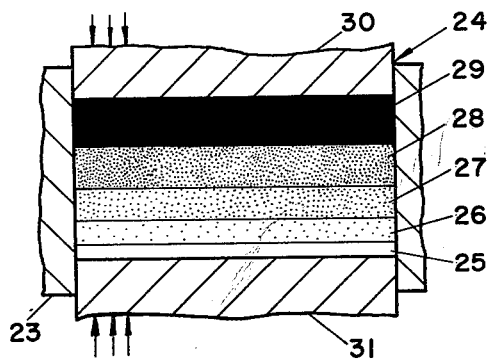
FIG. 5 is a diagrammatic view of one method of forming bodies of the nature of that illustrated in FIG. 1, in accordance with the present invention.

In FIGURE 5 there is illustrated schematically a method whereby a sheet, a plate or block such as a brick having a flame-resistant surface and excellent heat shock resistance can be made. As illustrated in FIGURE 5, a mold 23 having a cavity 24 therein conforming to the outer configuration of the article to be produced is first provided with a layer 25 of continuous phase material such as carbide or equivalent. This layer 25 is suitably made up of the continuous phase material in granular form. The layer is smoothed and leveled. Thereafter a layer 26 of admixed continuous and dispersed phase materials, such as carbide and graphite, for example in the ratio of 90% by weight of carbide to 10% by weight of graphite, is carefully positioned upon the continuous phase layer 25. Following, successive layers 27, 28, and 29 containing larger percentages of graphite are built up until the desired amount of material has been placed in the mold. An upper mold plunger 30 adapted to cooperate with a lower mold plunger 31 is thereafter placed upon the material and the entire assembly is subjected to heat and pressure sufficient to form a coherent hot-pressed body from the granular layers. If desired in setting up the layers of material in FIGURE 5, separators (not shown) can be used to keep the layers more distinctly apart. These separator materials can suitably be heat decomposable and appropriate grades of paper such as tissue are adapted to this use.

Figure 6:
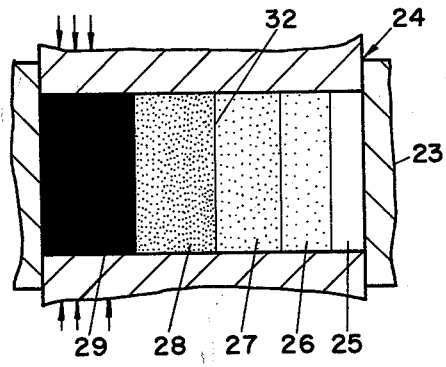
FIG. 6 is a diagrammatic view illustrating another method of producing bodies of the nature of that illustrated in FIG. 1.

In FIGURES 6 a mold 23 containing a cavity 24 is first provided with self-sustaining separator elements 32 such as sheets of fairly rigid paper. Into the various compartments formed by the separator elements, are placed first a layer 25 of pure carbide, boride or the like, and then successive layers 26, 27, 28 and 29 of decreasing carbide content and increasing graphite content. This assembly is then subjected to heat and pressure in the manner described for FIGURE 5 to form a coherent hot-pressed body having one surface of pure flame erosion-resistant carbide grading into highly thermal shock resistant material such as graphite.

Figure 7:
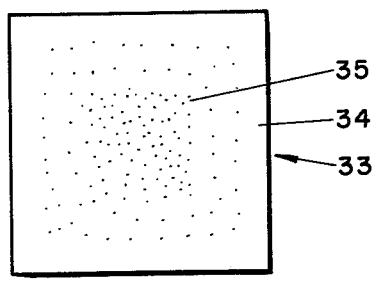
FIG. 7 is a view through a square rod, as in section but with section lines omitted, made according to the present invention.

In FIGURE 7 there is illustrated a body 33 of square section containing a carbide outer layer 34 and a carbide-graphite core 35, suitably made in accordance with the concept shown in FIG. 6. In making the article of FIGURE 7 in accordance with the technique of FIGURE 6, a separator element of substantially square configuration analogous to a ribbon stood on edge and formed into a square is positioned in a mold element. Thereafter a refractory such as a carbide is placed outside the separator and at the same time a granular mixture of carbide and graphite is placed inside the separator to support the same. The lay-up is then subjected to heat and pressure to form a hot-pressed body.

Figure 8:
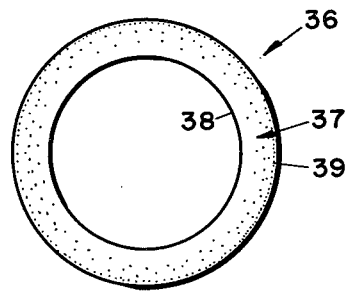
FIG. 8 is a view through a tube, as in section but with section lines omitted, made by the present invention.

In FIGURE 8 there is illustrated a tube 36 which can be made employing the technique illustrated in FIGURE 3. To form the tube, a core member corresponding to the inside diameter of the tube is coated with a slurry of carbide where the inner surface is to be the flame contacting surface, and such slurry is then dried to form a layer. The core member is then positioned inside a mold sleeve and loose granular material of desired admixture is placed around the coated core member. Thereafter a plunger is brought to bear against the layer and mixture contained within the mold sleeve and by the application of pressure and heat a hot-pressed body of the configuration shown in FIGURE 5 is provided. Thus a tube 36 having a wall 37 with carbide inner surface 38, grading into an admixed carbide-graphite outer wall surface 39 is provided. Of course it will be obvious that where the outer surface of the tube is to be the flame contacting face and is to be rendered flame erosion resistant, the core member of the mold will be coated with a slurry containing carbide and graphite in desired admixture and pure carbide will be poured around the coated core member after the same is inserted in the mold sleeve.

The following examples illustrate the production of specific bodies thereby highlighting the present invention.

EXAMPLE I

A rocket nozzle insert having an internal configuration of venturi shape and a throat diameter of 0.53 inch was fabricated from the following materials:

First layer: 61 grams 8 tantalum carbide·zirconium carbide
Second layer (60/40):
  98 grams 8 tantalum carbide·zirconium carbide
  10 grams —40+60 graphite
Third layer (30/70):
  73 grams 8 tantalum carbide·zirconium carbide
  25 grams —40+60 graphite A mold typified by that shown in FIGURE 3 of the drawings was employed to make the rocket nozzle. First a dispersion of the carbides material of the first layer in 10% aqueous polyvinyl alcohol was prepared of about the viscosity of paint. The dispersion was then painted on the mold core and dried. A second layer was then formed in the same manner from the materials shown. Thereafter the mold was partially assembled and the third layer was placed in the mold. Hot pressing was then effected at 2250–2300° C. under a pressure of 3000 p.s.i.

EXAMPLE II

A rocket nozzle of high resistance to flame erosion and thermal shock was prepared in the manner described in Example I from the following materials:

First layer: 35 grams niobium carbide
Second layer (60/40):
  56 grams niobium carbide
  10 grams —40+60 graphite
Third layer (30/70):
  42 grams niobium carbide
  25 grams —40+60 graphite

The continuous phase materials

The continuous phase materials applicable to use in the present invention include carbides, borides, nitrides, silicides and oxides of the metals of groups II, III, IV, V and VI of the Periodic Chart of the Elements. These materials are characterized by high Young's modulus of elasticity in the range from about 20–100×10⁶ p.s.i. Boron nitride is an exception within this grouping and it will be discussed as such below.

Carbides within the scope of the invention include those of the metals of groups III, IV, V and VI. In group III, boron is applicable; in group IV, silicon, titanium, zirconium and hafnium are applicable; in group V, vanadium, niobium, and tantalum are applicable; and in group VI, chromium, molybdenum, and tungsten are applicable.

Especially valuable combinations wherein carbides form a continuous phase and graphite is a dispersed phase include the following:

8 tantalum carbide·zirconium carbide
4 tantalum carbide·zirconium carbide (solid solution)
4 tantalum carbide-hafnium carbide (solid solution)
tantalum carbide·niobium carbide (solid solution)
niobium carbide·zirconium carbide
zirconium carbide·hafnium carbide Borides adapted to use in the invention include those of the metals of groups IV, V and VI. In group IV, silicon, titanium, zirconium and hafnium are applicable; in group V, niobium, and tantalum are applicable; and in group VI, molybdenum is applicable.

Nitrides applicable to use in the invention include those of the metals of groups III and IV of the periodic chart. In group III, aluminum and boron are applicable; and in group IV, silicon, titanium, zirconium and hafnium are applicable.

Silicides applicable include those of the metals of groups IV, V and VI. In group IV, zirconium, titanium and hafnium are applicable; in group V, tantalum and niobium are applicable; and in group VI molybdenum and tungsten are applicable.

Oxides applicable include those of metals of groups II, III, and IV. In group II, beryllium and magnesium are applicable; in group III, aluminum and yttrium are applicable; and in group IV, silicon, titanium, zirconium and hafnium are applicable. Also the metals of the lanthanide series and thorium and uranium of the actinide series are applicable.

As used in the present specification, Young's modulus is a universal term for expressing tensile or compressive stresses and strains in accordance with the fact that with a given material, a given longitudinal stress produces a strain of the same magnitude whether the stress is a compression or a tension. However, the ratio of tensile stress to tensile strain, for a given material, equals the ratio of compressive stress to compressive strain. This ratio is called the stretch modulus or Young's modulus of a material and is denoted as follows:

$$Y = \frac{\text{tensile strength}}{\text{tensile strain}} = \frac{F/A}{\Delta l/l_o}$$

where $F$=force; $A$=area; $\Delta l$=change in length; and $l_o$=original length.

Since a strain is a pure number, the units of Young's modulus are the same as those of stress, namely, force per unit area. Typical values for continuous phase materials to be included within the present invention are tabulated below and are expressed in pounds per square inch.

| | |
|---|---|
| Silicon carbide | $58.2 \times 10^6$ |
| Titanium carbide | $51.0 \times 10^6$ |
| Zirconium carbide | $57.5 \times 10^6$ |
| Tungsten carbide | $102.5 \times 10^6$ |
| Boron carbide | $64.8 \times 10^6$ |
| Zirconium boride | $63.8 \times 10^6$ |
| Aluminum nitride | $50 \times 10^6$ |
| Boron nitride | $12.4 \times 10^6$ |
| Molybdenum silicide | $55.0 \times 10^6$ |
| Beryllium oxide | $45.0 \times 10^6$ |
| Magnesium oxide | $42.7 \times 10^6$ |
| Aluminum oxide ($Al_2O_3$) | $57.41 \times 10^6$ |
| Zirconium oxide | $20.3 \times 10^6$ |
| Gadolinium oxide | $18 \times 10^6$ |
| Samarium oxide | $26.5 \times 10^6$ |
| Thorium oxide | $34.9 \times 10^6$ |
| Uranium oxide | $28 \times 10^6$ |

Dispersed phase materials

These materials include graphite and boron nitride. Graphite has a Young's modulus of $1 \times 10^6$ p.s.i. and boron nitride has a Young's modulus of $12 \times 10^6$ p.s.i. When added to the continuous phase materials described above, graphite and boron nitride impart a high degree of thermal shock resistance and substantially lower the bulk density.

Boron nitride

This material though having a relatively low Young's modulus of $12 \times 10^6$ p.s.i., nevertheless is highly susceptible to fracture as the result of thermal shock, when formed into a dense, compacted body. However, when boron nitride is admixed with graphite, a body of high thermal shock resistance is provided. Thus it acts as a continuous phase material when admixed with graphite.

Boron nitride also displays a unique dual function characteristic. Thus it also imparts thermal shock resistance to bodies made from a carbide or other continuous phase material as described above.

Accordingly boron nitride can be used either as a dispersed phase material or as a continuous phase material. Therefore a body of silicon carbide and boron nitride, by virtue of the latter material, is highly resistant to thermal shock; similarly a body of boron nitride as the continuous phase and graphite as the dispersed phase exhibits high thermal shock resistance.

Especially valuable combinations wherein boron nitride forms the dispersed phase include the combination of zironium boride and molybdenum disilicide as the continuous phase; also boron nitride in combination with zirconium boride alone provides an excellent body.

Bodies made in accordance with the present invention are adapted to withstand temperatures in the range of about 4000–6000° F.

Hot pressing of bodies in accordance with the invention is usually effected at temperatures in the range of 1800–2500° C. and at pressures in the range from 2000–3000 p.s.i.

While the present invention has been described in connection with preferred embodiments of the same, it is subject to reasonable modifications as will become apparent to those skilled in the art and such modifications are to be included within the scope of the invention as defined by the appended claims.

I claim:

1. A hot pressed refractory body having high resistance to flame erosion and thermal shock, consisting essentially of a thin layer of a dense refractory material having a high Young's modulus of elasticity at all surfaces of said body which are adapted to be subjected to direct contact with high velocity flames, the remainder of said body from a point adjacent said surface extending into the interior thereof consisting of said high modulus material and a refractory material having a low Young's modulus of elasticity, the ratio of said high modulus material to said low modulus material gradually decreasing from said point adjacent said surfaces into said body.

2. The body as defined in claim 1 in which the concentration of said low modulus material gradually increases in concentration from about 10% by weight at a point adjacent said layer of high modulus material, to about 100% by weight at a point in said body.

3. The body as defined in claim 1 in which the dense refractory material having a high Young's modulus of elasticity is at least one material selected from the group consisting of carbides, borides, silicides, nitrides, and oxides of metals of Groups II, III, IV, V, and VI of the Periodic Table and the refractory material having a low Young's modulus of elasticity is graphite.

4. The body as defined in claim 1 wherein the high modulus material consists of tantalum carbide and zirconium carbide and the low modulus material is graphite.

5. The body as defined in claim 1 wherein the high modulus material consists of tantalum carbide and hafnium carbide and the low modulus material is graphite.

6. The body as defined in claim 1 wherein the high modulus material is a solid solution of tantalum carbide and zirconium carbide and the low modulus material is graphite.

7. The body as defined in claim 1 wherein the high modulus material consists of at least one material selected from the group consisting of the carbides, nitrides, silicides and oxides of metals of Groups II, III, IV, V and VI of the Periodic Table and the low modulus material is boron nitride.

8. A hot pressed refractory body having high resistance to flame erosion and thermal shock, said body having a single surface which is adapted to be subjected to direct contact with high velocity flames, said surface consisting of 100% dense refractory material having a high Young's modulus of elasticity, forming a thin continuous layer at said surface, said high modulus material immediately blending with and into a zone of lesser density which extends from a point adjacent said surface to another surface of said body, said zone consisting of said high modulus material and a refractory material having a low Young's modulus of elasticity, the ratio of said low modulus material to said high modulus material in said zone gradually increasing from a point adjacent said surface to another surface.

9. The body as defined in claim 8 in which said low modulus material gradually increases in concentration from 0% at said surface adapted to be exposed to high velocity flames, to 100% at a surface other than said surface.

10. The body as defined in claim 8 in which said body has a plurality of surfaces adapted to be subjected to direct contact with high velocity flames, each of said surfaces consisting of a thin continuous layer of a dense refractory material having a high Young's modulus of elasticity, the ratio of said high modulus material to said low modulus material gradually decreasing from a point adjacent said sufaces into the interior of said body.

11. The body as defined in claim 8 in which the dense refractory material having a high Young's modulus of elasticity is at least one material selected from the group consisting of carbides, borides, silicides, nitrides and oxides of metals of Groups II, III, IV, V, and VI of the Periodic Table and the refractory material having a low Young's modulus of elasticity is graphite.

References Cited in the file of this patent

UNITED STATES PATENTS

| | | |
|---|---|---|
| 1,345,377 | Linbarger | July 6, 1920 |
| 2,937,101 | Nelson | May 17, 1960 |
| 2,988,522 | Smith | June 13, 1961 |
| 3,065,088 | James | Nov. 20, 1962 |
| 3,079,273 | Johnson | Feb. 26, 1963 |